United States Patent
Lee et al.

(10) Patent No.: US 7,391,715 B2
(45) Date of Patent: Jun. 24, 2008

(54) TRANSMITTER DEVICE AND TRANSMITTING METHOD USING OFDM AND MC-CDMA

(75) Inventors: Kyesan Lee, Saitama (JP); Takeo Ohseki, Saitama (JP); Hiroyasu Ishikawa, Saitama (JP); Hideyuki Shinonaga, Saitama (JP)

(73) Assignee: KDDI Corporation, Tokyo (JP)

( * ) Notice: Subject to any disclaimer, the term of this patent is extended or adjusted under 35 U.S.C. 154(b) by 879 days.

(21) Appl. No.: 10/686,560

(22) Filed: Oct. 17, 2003

(65) Prior Publication Data

US 2004/0141481 A1 Jul. 22, 2004

(30) Foreign Application Priority Data

Nov. 1, 2002 (JP) ............................. 2002-319843

(51) Int. Cl.
*H04J 11/00* (2006.01)
(52) U.S. Cl. ...................................... 370/208; 370/335
(58) Field of Classification Search ................ 370/204, 370/208, 328, 342, 335, 321, 330, 442, 465
See application file for complete search history.

(56) References Cited

U.S. PATENT DOCUMENTS

| | | | | |
|---|---|---|---|---|
| 7,151,937 B2 * | 12/2006 | Jin et al. | ............... | 455/450 |
| 2001/0028637 A1 * | 10/2001 | Abeta et al. | ............... | 370/335 |
| 2001/0031639 A1 * | 10/2001 | Makipaa | ............... | 455/450 |
| 2002/0172160 A1 * | 11/2002 | Moulsley | ............... | 370/252 |
| 2003/0031121 A1 * | 2/2003 | Sudo | ............... | 370/203 |
| 2003/0081538 A1 * | 5/2003 | Walton et al. | ............... | 370/206 |
| 2003/0165131 A1 * | 9/2003 | Liang et al. | ............... | 370/342 |
| 2004/0028021 A1 * | 2/2004 | Varshney et al. | ............... | 370/342 |
| 2004/0037214 A1 * | 2/2004 | Blasco Claret et al. | ............... | 370/203 |

FOREIGN PATENT DOCUMENTS

| | | |
|---|---|---|
| EP | 1 107 473 | 6/2001 |
| EP | 1 130 840 | 9/2001 |
| EP | 1 221 778 | 7/2002 |
| EP | 1 223 700 | 7/2002 |
| EP | 1249955 A1 * | 10/2002 |
| GB | 2 384 958 | 8/2003 |
| JP | 10-93650 | 4/1998 |

(Continued)

OTHER PUBLICATIONS

Masahiro Umehira, et al., "OFDM/CDMA Technologies for Future Broadband Mobile Communication Systems", IEICE Trans. Fundamentals, vol. E85-A, No. 12, Dec. 2002, pp. 2804-2812.

(Continued)

*Primary Examiner*—Ricky Ngo
*Assistant Examiner*—Kan Yuen
(74) *Attorney, Agent, or Firm*—Oblon, Spivak, McClelland, Maier & Neustadt, P.C.

(57) ABSTRACT

A transmitter device comprises an OFDM transmission unit, a MC-CDMA transmission unit, and a control unit for selecting either the OFDM transmission unit or the MC-CDMA transmission unit at slot time assigned to a receiver device in response to propagation conditions for the receiver device. The propagation conditions are a distance from the receiver device and a CINR.

2 Claims, 4 Drawing Sheets

FOREIGN PATENT DOCUMENTS

| | | |
|---|---|---|
| JP | 11-150530 | 6/1999 |
| JP | 2001-251270 | 9/2001 |
| JP | 2001-320346 | 11/2001 |
| JP | 2002-9734 | 1/2002 |
| JP | 2002-204192 | 7/2002 |
| JP | 2002-246958 | 8/2002 |
| WO | WO 03/052983 | 6/2003 |

OTHER PUBLICATIONS

Noriyuki Maeda, et al., "VSF-OFCDM Using Two-Dimensional Spreading and its Performance", The Institute of Electronics, Information and Communication Engineers, Technical Report of IEICE, May 2002, pp. 59-64.

H. Atarashi, et al., Proc. of Third International Workshop on Multi-Carrier Spread Spectrum & Related Topics, pp. 113-122, "Variable Spreading Factor Orthogonal Frequency and Code Division Multiplexing (VSF-OFCDM)", Sep. 2001.

Hiroyuki Atarashi, et al., "Performance of Broadband OFCDM Packet Wireless Access Employing Variable Spreading Factor", Proceedings of the 2001 Communications Society Conference on IEICE, Aug. 29, 2001, p. 333.

Hiroyuki Atarashi, et al., "Performance of VSF-OFCDM with Two-Dimensional Spreading Prioritizing Time Domain Spreading", Technical Report of IEICE, vol. 102, No. 150, Jun. 21, 2002, pp. 61-66 (with English Abstract).

* cited by examiner

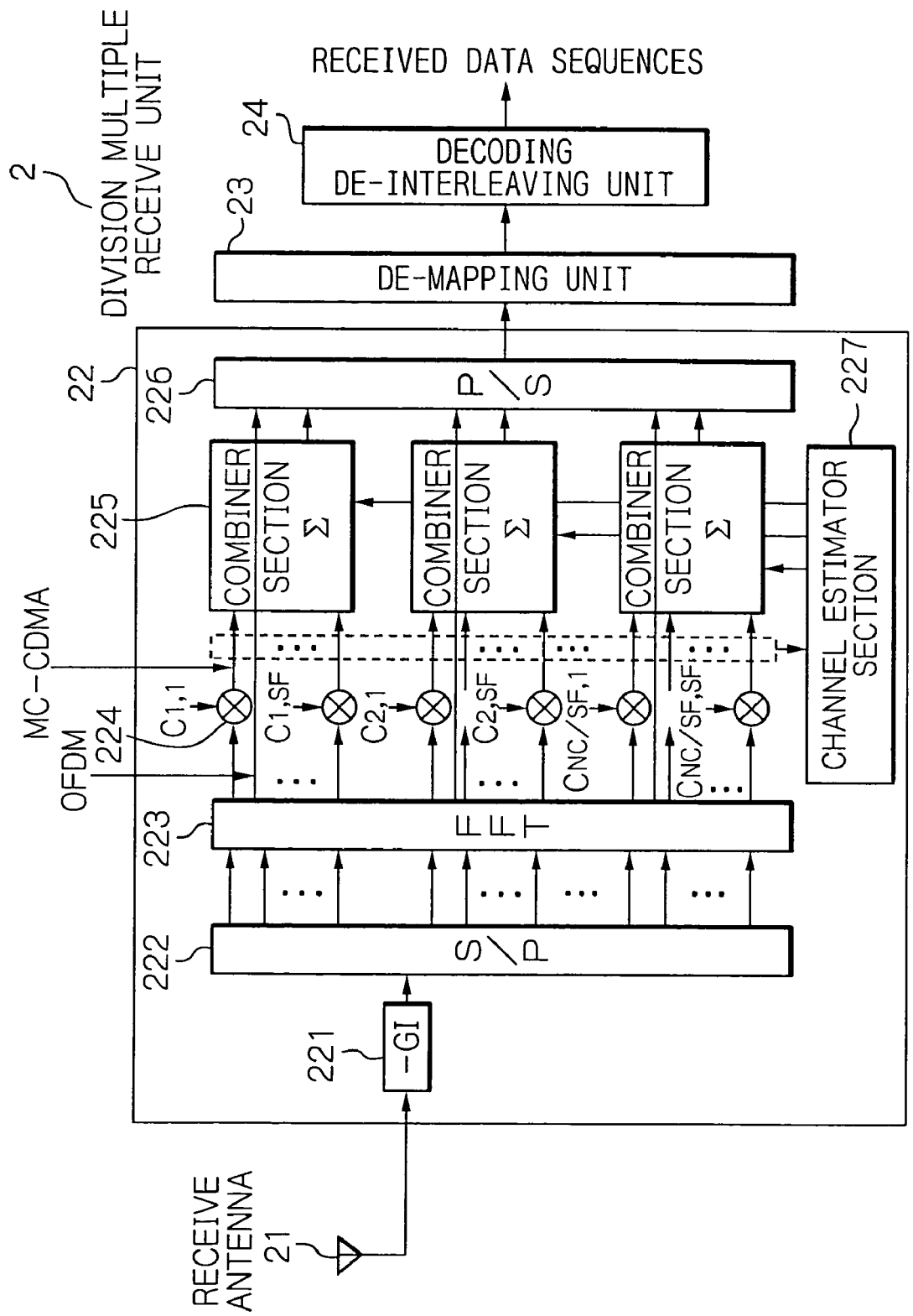

TRANSMITTER DEVICE AND TRANSMITTING METHOD USING OFDM AND MC-CDMA

FIELD OF THE INVENTION

The present invention relates to a transmitter device and a transmitting method for a mobile communication system.

DESCRIPTION OF THE RELATED ART

Recent mobile communication system has IMT-2000 (International Mobile Telecommunications-2000) using CDMA2000 (Code Division Multiple Access-2000) ready for market use. The IMT-2000 can achieve a transmission speed of 144 kbps during movement and 2 Mbps during rest.

In the future, higher speed and higher quality will be requested for the mobile communication system in order to realize a download of high-definition moving picture or massive file. A 4th generation mobile communication system will be possible to achieve a transmission speed of maximum 20 Mbps during movement and 100 Mbps during rest.

Such mobile communication system requires to have both a strong tolerance against the declining transmission quality and a high-effect use of frequency. Transmission schemes of an orthogonal frequency division multiplexing (OFDM) that transmits signals in high-speed and high-capacity and a multiple carrier-code division multiple access (MC-CDMA) that transmits spread symbols using a plurality of sub-carriers may satisfy these requirements.

In the 4th generation mobile communication system, VSF-OFCDM (Variable Spreading Factor-Orthogonal Frequency and Code Division Multiplexing) scheme has proposed in order to achieve both a high-speed and high-capacity transmission and a tolerance against intersymbol interference. This scheme technique is described in MEDA, ARATA, ABETA and SAWAHASHI, "VSF-OFDM using 2-dimensional spreading and its characteristic", RCS, pp. 59-64, May 2002, for example.

The VSF-OFCDM scheme spreads symbols in two-dimensions of frequency and time and controls radio parameters (a spreading rate in frequency and time domain, modulation scheme, a channel coding rate, the number of code multiplex) in adaptation in response to a propagation conditions.

In a cellular system using wide band signal, the same frequency is repeatedly used.

The OFDM scheme has difficulty in transmit high-capacity data through in a low CINR area where interference may occur by the same channels in other cell. The CINR (Carrier to Interference Noise Ratio) means a ratio of carrier power to interference signal power and noise power.

The MC-CDMA scheme has a problem of a lower transmission speed than that of the OFDM. This is because the MC-CDMA scheme simultaneously transmits the same-copied signal through the respective sub-carriers whereas the OFDM scheme transmits different signals through the respective carriers. In order to solve this problem in the MC-CDMA scheme, a high-speed transmission scheme using code multiplexing is proposed. However, this high-speed transmission scheme has a problem that a code orthogonal performance deteriorates under a multi-pass environment.

The VSF-OFCDM scheme includes complex hardware structure in order to perform both a frequency spreading and a time spreading. Furthermore, it is very difficult to independently control the frequency spreading and the time spreading for each user by means of the hardware.

SUMMARY OF THE INVENTION

It is therefore an object of the present invention to provide a transmitter device and a transmitting method for a mobile communication system by using OFDM and MC-CDMA schemes in order to solve the problems in each scheme mentioned above.

According to the present invention, a transmitter device for communicating with a plurality of receiver devices in cell through radio channel, the transmitter device includes an OFDM transmission unit, a MC-CDMA transmission unit, and a control unit for selecting either the OFDM transmission unit or the MC-CDMA transmission unit at slot time assigned to the receiver device in response to propagation conditions for the receiver device.

It is preferred that the control unit dynamically selects a modulation scheme and a channel coding rate in both the OFDM transmission unit and the MC-CDMA transmission unit, and further dynamically selects a spreading rate when using the MC-CDMA transmission unit.

It is also preferred that the propagation conditions are a distance from the receiver device, and a ratio of carrier power to interference signal power and noise power.

It is further preferred that the control unit selects the OFDM transmission unit when the distance is short and the a ratio of carrier power to interference signal power and noise power is high, and the MC-CDMA transmission unit when the distance is long or the ratio of carrier power to interference signal power and noise power is low.

It is still preferred that the propagation conditions further include a delay spread and a maximum Doppler frequency.

It is preferred that the transmitter device further includes a transmit power control unit for controlling a transmit power at slot time assigned to the receiver device.

It is also preferred that the transmitter device further includes a unit for performing site diversity to the receiver device sited in a boundary of between the cells so that the transmitter device simultaneously transmits the same signal as other transmitter device in other cell.

According to the present invention, also, a transmitting method of a device for communicating with a plurality of devices in a cell through radio channels, the transmitting method includes the step of selecting either an OFDM scheme or a MC-CDMA scheme at slot time assigned to the receiver device in response to propagation conditions for the receiver device, and transmitting signal by using the selected scheme.

It is preferred that the selecting step dynamically selects a modulation scheme and a channel coding rate, and further dynamically selects a spreading rate when using the MC-CDMA scheme.

It is also preferred that the propagation conditions are a distance from the receiver device and a ratio of carrier power to interference signal power and noise power.

It is further preferred that the selecting unit selects the OFDM scheme when the distance is short and the ratio of carrier power to interference signal power and noise power is high, and the MC-CDMA scheme when the distance is long or the ratio of carrier power to interference signal power and noise power is low.

It is still further preferred that the propagation conditions further includes a delay spread and a maximum Doppler frequency.

It is preferred that the method further comprises a step of controlling a transmit power control at slot time assigned to the receiver device.

Further objects and advantages of the present invention will be apparent from the following description of the preferred embodiments of the invention as illustrated in the accompanying drawings.

BRIEF DESCRIPTION OF THE DRAWINGS

FIGS. 2A and 2B show a block diagram schematically illustrating a configuration of a transmitter device and a receiver devise in a preferred embodiment according to the present invention.

DESCRIPTION OF THE PREFERRED EMBODIMENTS

Figure 1:
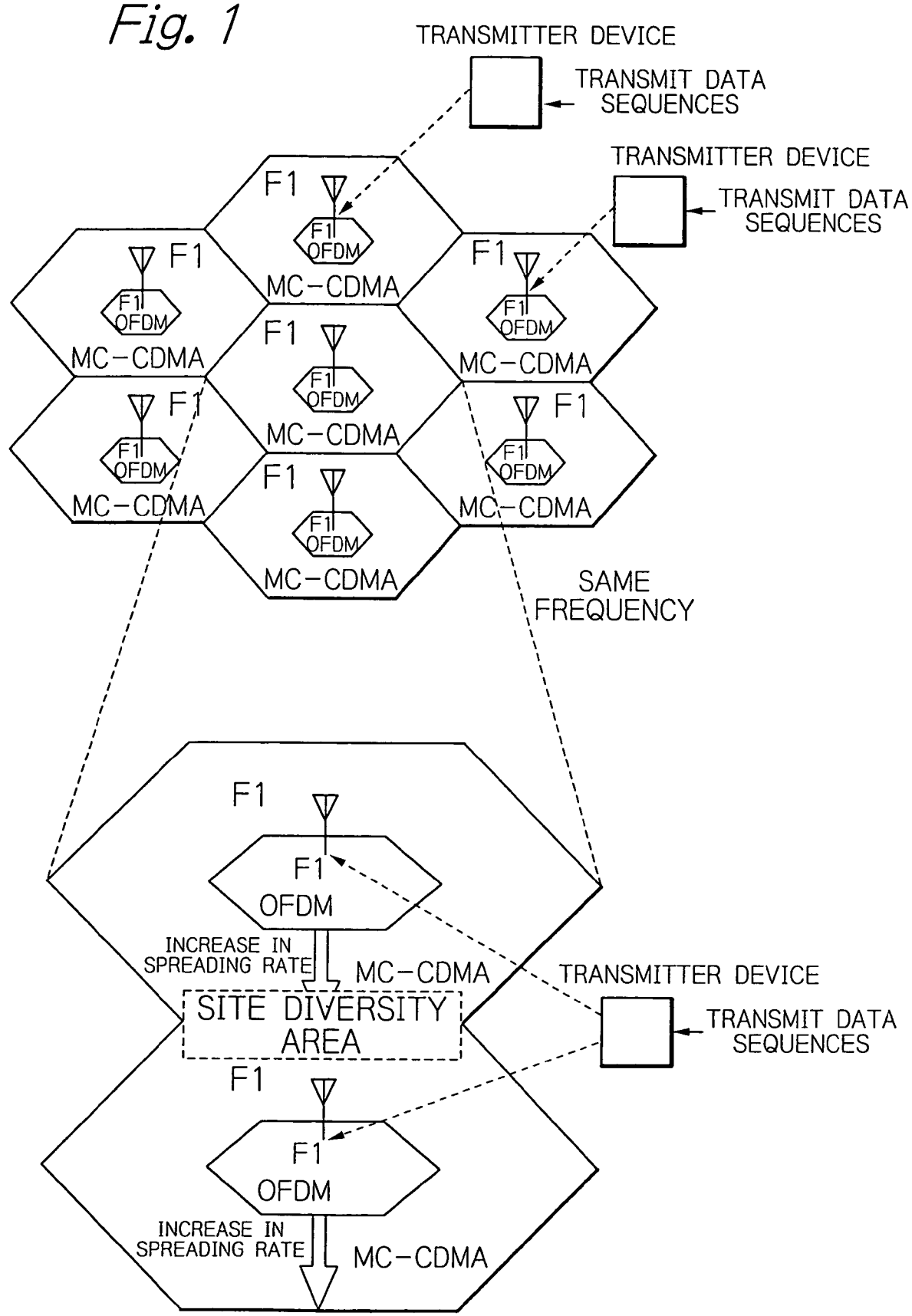
FIG. 1 illustrates a cell configuration according to the present invention.

FIG. 1 schematically illustrates a cell configuration according to the present invention.

The present invention selectively uses either an OFDM scheme with high-speed transmission or a MC-CDMA scheme with high tolerance against interference signals, in response to propagation conditions. Thereby, a broadband radio communication system with high-speed and high-quality can be provided. The OFDM scheme is used in an area where a distance from a base station is short and where a CINR is high. On the one hand, the MC-CDMA scheme is used in an area where a distance from the base station is long or where the CINR is low. In the multiplexing, the OFDM uses a TDM scheme, and the MC-CDMA uses a CDM (Code Division Multiplexing) or TDM scheme. The OFDM and MC-CDMA scheme are alternated in time base.

According to the OFDM scheme, it is possible to transmit data at high-speed and high-capacity. However, it is susceptible to interference from other cells in an area where the CINR is low. Thus, in the low CINR area, the transmission quality decreases and therefore, it is difficult to transmit data at high-capacity. In such low CINR area, the transmission quality can be made high by using the MC-CDMA scheme. Furthermore, in order to obtain the maximum throughput in response to change in the propagation conditions, an adaptive modulation and an adaptive control of the channel coding rate may be performed.

Depending upon increase in the distance from the base station or decrease in the CINR, the spreading rate and the adaptive modulation are controlled as follows. These controls are applied for each receiver device, and performed by an adaptive modulation control unit mentioned later.

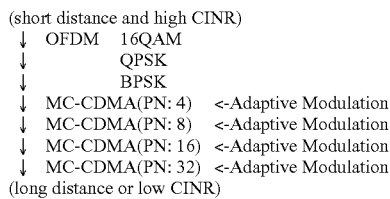

In the configuration of FIG. 1, since each cell uses a microwave band of which an available frequency is limited, one cell repetition is used in order to improve the frequency use efficiency. The one cell repetition means for using the same frequency in adjacent cells. Therefore, the interference at the same frequency may occur between the cells. Of course, the present invention is applicable to N cells repetition that the N frequency bands is placed so that the same frequency may not adjoin if possible.

In order to reduce the interference applied to other cells as much as possible, it is desired to control a transmitting power in the OFDM scheme at slot time.

On the one hand, the MC-CDMA scheme has high tolerance against the interference signal, since it copies one signal for each receiver device and the copied signal is multiplexed by different spreading codes.

For the OFDM and MC-CDMA schemes, a modulation scheme, a channel coding rate and a spreading ratio are dynamically changed based on a distance from the receiver device, a CINR, a delay spreading and/or a maximum Doppler frequency. In addition, in the case of the MC-CDMA scheme, these may be changed based on a position of the receiver device, the number of the receiver devices, the traffic and others.

As shown in FIG. 1, site diversity is performed in an area near a boundary of the adjacent cell. In such area where the spreading ratio in the MC-CDMA is high and the intersymbol interference tends to occur, the transmission quality tends to greatly deteriorate. Therefore, by performing the site diversity, a certain diversity gain can be obtained without excessively increasing the spreading ratio of the MC-CDMA scheme to improve the transmission quality.

Whether the site diversity is to be performed or not will be determined based on not only the position of the receiver device but also the number of receiver devices, the traffic and others.

According to the present invention, since the transmit power and the interference power are reduced by combining the transmit power control in the OFDM scheme and the site diversity effect in the MC-CDMA scheme, the transmission capacity increases.

Using of MMSE (Minimum Mean Square Error) method and MLD (Maximum Likelihood Detection) method will solve, the intersymbol interference in MC-CDMA generated in the receiver device.

Figure 2A:
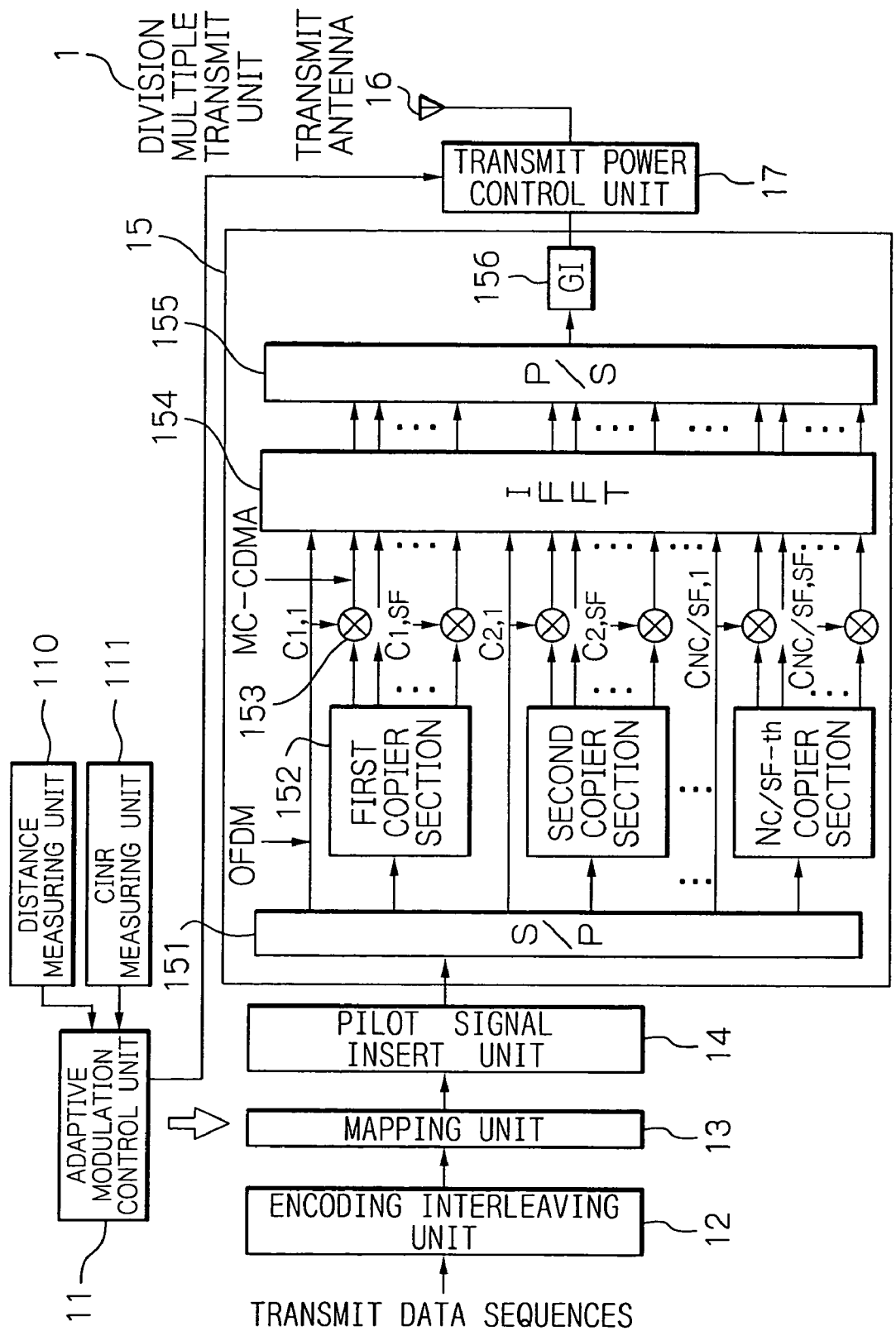

FIGS. 2A and 2B schematically illustrate a configuration of the transmitter device and the receiver device according to the present invention.

The transmitter device 1 has, as shown in FIG. 2A, an adaptive modulation control unit 11 for adaptively controlling the modulation scheme and others, an encoding interleaving unit 12 for encoding transmit data sequence by performing error-correction and interleaving the encoded data, a mapping unit 13 for mapping the interleaved data to signal points on a conjugate plane, a pilot signal insertion unit 14, a division multiple transmit unit 15, a transmit antenna 16, and a transmit power control unit 17.

The adaptive modulation control means 11 controls the scheme and others in response to a distance from a distance measuring unit 110, and to a CINR from a CINR measuring unit 111. The distance measuring unit 110 measures a distance from the receiver device. The CINR measuring unit 111 measures a CINR for the receiver device.

The division multiple transmit unit 15 converts the serial signal into Nc/SF parallel signals ($S_1$, $S_2$, . . . , $S_{Nc/SF}$) at a serial to parallel (S/P) converter section 151. In the case of OFDM, the output signals from the S/P converter section 151 is directly input into the inverse fast-Fourier transform (IFFT) section 154. In case of the MC-CDMA scheme, the output signal respectively is input into a copier section 152. The signal Si (i=1, 2, . . . , Nc/SF) respectively is copied to SF symbols ($S_{1,1}, \ldots, S_{1,SF}, S_{2,1}, \ldots S_{2,SF}, \ldots, S_{Nc/SF,1}, \ldots, S_{Nc/SF,SF}$) at the copier section 152. The copied symbols are multiplied by constants $C_{i,j}$ ($i=1, 2, \ldots, Nc/SF, j=1, 2, \ldots, SF$) at a spreading section 153. Nc is an integer representing the number of points of an IFFT section or the number of sub-carriers, and SF is an integer and a sub-multiple of Nc.

In case of the OFDM scheme, the output symbol from the S/P converter section 151 is transformed into values at the respective sample points in a time base at the IFFT section 154. In case of the MC-CDMA scheme, the total Nc(Nc/SF*SF) symbols multiplied are transformed at the IFFT section 154. The parallel signals are converted into a serial signal at a parallel to serial (P/S) converter section 155, and a guard interval is added to the serial signal at a guard interval (GI) section 156. The guard interval is used in order to avoid the intersymbol interference by a delay wave. The serial signal from the GI section 156 is input into the transmit power control unit 17. The transmit control unit 17 controls the transmit power at slot time according to a control signal from the adaptive modulation control unit 11. The serial signal from the unit 17 is transmitted from the transmit antenna 16.

The receiver device 2 has, as shown in FIG. 2B, a receive antenna 21, a division multiple receive unit 22, a de-mapping unit 23 and a decoding de-interleaving unit 24.

The division multiple receive unit 22 correlates the pre-amble signal at a guard interval section 221, and the guard interval is removed. The GI-removed serial signal is converted into Nc(Nc/SF*SF) parallel signals $S_{i,j}$ ($S_{1,1}, \ldots, S_{1,SF}, S_{2,1}, \ldots, S_{2,SF}, \ldots, S_{Nc/SF,1}, \ldots, S_{Nc/SF,SF}$) at a serial to parallel (S/P) converter section 222. The converted signal $S_{i,j}$ is transformed into signals at a fast-Fourier transform (FFT) section 223 of Nc points. In case of the OFDM scheme, the output signals from the FFT section 223 is directly input into a parallel to serial (P/S) converter section 226. In case of the MC-CDMA scheme, the output signal respectively is input into an inverse spreading section 224, and is multiplied by constant $C_{i,j}$ ($C_{1,1}, \ldots, C_{1,SF}, C_{2,1}, \ldots, C_{2,SF}, \ldots, C_{Nc/SF,1}, \ldots, C_{Nc/SF,SF}$). Then, a channel estimation result of each sub-carrier obtained from a pilot symbol is output from a channel estimator section 227. A distortion of the propagation path is compensated by using the channel estimation result at combiner sections 225. The signal is inverse-spread on frequency base according to an integration operation of a matching filter.

In case of the OFDM scheme, the output signal from the FFT section 223 is converted into a serial signal at the P/S converter section 226. In case of the MC-CDMA scheme, the inverse-spread signals are converted to a serial signal at the section 226.

Finally, the serial signal is de-mapped at the de-mapping unit 23 and is demodulated at the decoding interleaving unit 23, and thus the transmitted signal is reconstituted.

Figure 3:
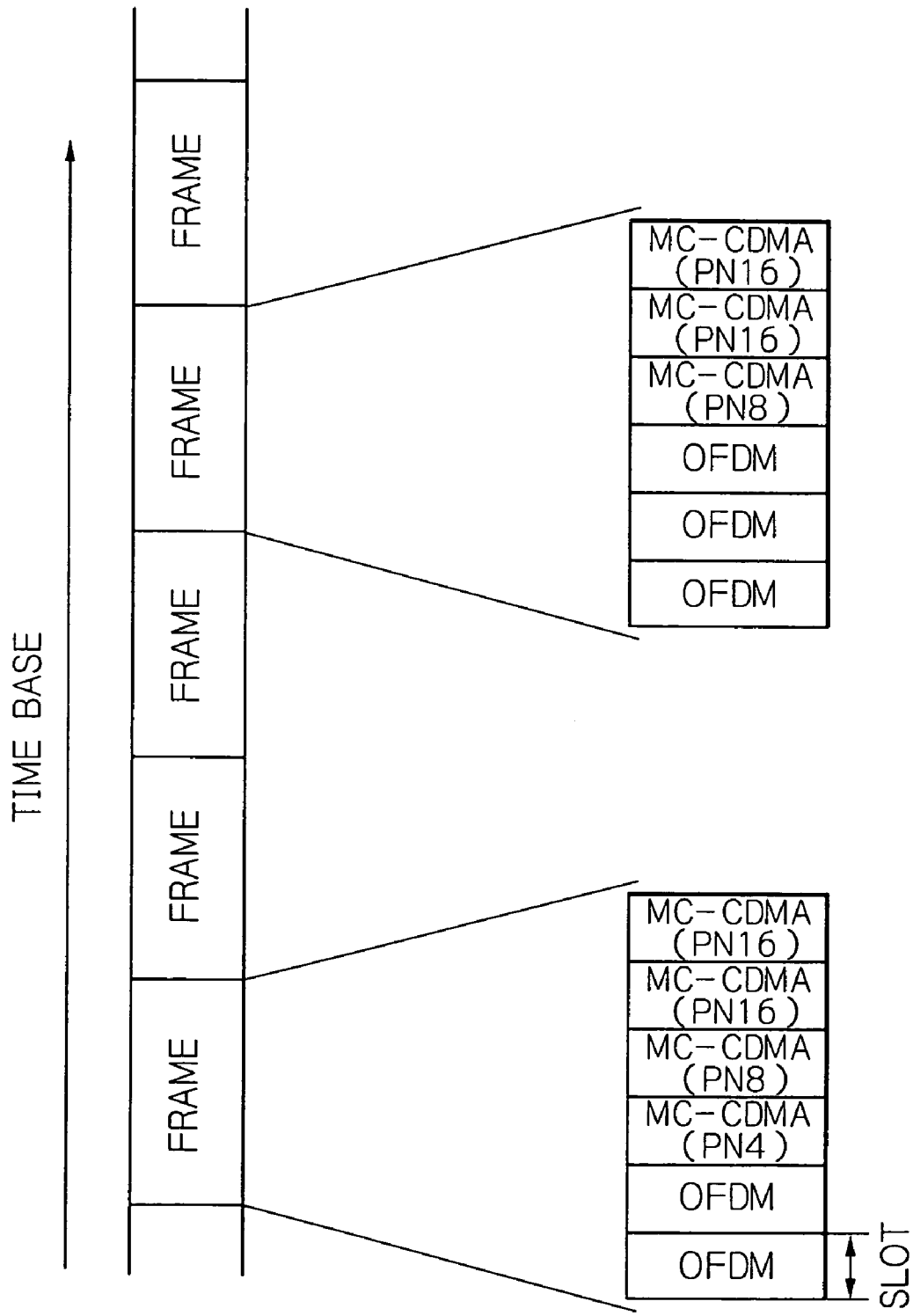
FIG. 3 illustrates a frame configuration for slot assignment based on a time division multiplexing (TDM) according to the present invention.

FIG. 3 schematically illustrates a frame configuration for slot assignment based on the TDM according to the present invention.

As shown in FIG. 3, based on a frame consisted of a plurality of time slots, the radio parameters (a modulation scheme, a transmission rate, a spreading rate and others) are assigned to each time slot. Thereby, it becomes possible to assign a channel at the optimum according to the number of users, QoS (Quality of Service), the transmission quality and others.

Random access in an uplink channel fundamentally transmits the packets based on Slotted ALOHA. For example, MC-DS/CDMA (Multiple Carrier-Direct Sequence/Code Division Multiple Access) scheme or SC-DS/CDMA (Single Carrier-Direct Sequence/Code Division Multiple Access) scheme is applicable.

As mentioned above, according to the present invention, the transmission quality of a radio link is improved by virtue of the high-speed transmission in the OFDM scheme, and the frequency diversity effect and the site diversity effect in the MC-CDMA scheme. Therefore, a broadband radio access transmission in higher-speed and higher-quality can be expected. In particular, the hardware will be relatively simple structure and the transmission speed becomes over 100 Mbps at the maximum, because the frequency domain only is spread for a downlink channel from the base station.

Specifically, in an area where a distance from a base station is short and CINR is high, the high-speed transmission is achieved by using the OFDM scheme. On the other hand, in an area where a distance from the base station is long or CINR is low, the transmission quality is improved by using the MC-CDMA scheme. This is because the MC-CDMA scheme can use the high spreading rate and the frequency diversity effect. Furthermore, the intersymbol interference is reduced by applying the site diversity for the receiver device in an area between adjacent cells where the interference occurs by the same channel from other cells.

Many widely different embodiments of the present invention may be constructed without departing from the spirit and scope of the present invention. It should be understood that the present invention is not limited to the specific embodiments described in the specification, except as defined in the appended claims.

What is claimed is:

1. A transmitter device for communicating with a plurality of receiver devices in a cell through radio channels, said transmitter device comprising:
    an OFDM transmission means;
    a MC-CDMA transmission means; and
    a control means for selecting either said OFDM transmission means or said MC-CDMA transmission means at a slot time assigned to a receiver device in response to propagation conditions for the receiver device,
    wherein said propagation conditions are a distance from said receiver device and a ratio of carrier power to interference signal power and noise power; and
    said control means selects said OFDM transmission means when the distance is short and the ratio of carrier power to interference signal power and noise power is high, and said MC-CDMA transmission means when the distance is long or the ratio of carrier power to interference signal power and noise power is low.

2. A transmitting method of a device for communicating with a plurality of devices in a cell through radio channels, said transmitting method comprising the steps of:
    selecting either an OFDM scheme or a MC-CDMA scheme at a slot time assigned to a receiver device in response to propagation conditions for said receiver device; and
    transmitting a signal by using said selected scheme,
    wherein said propagation conditions are a distance from the receiver device and a ratio of carrier power to interference signal power and noise power; and
    said selecting means selects said OFDM scheme when said distance is short and the ratio of carrier power to interference signal power and noise power is high, and said MC-CDMA scheme when the distance is long or the ratio of carrier power to interference signal power and noise power is low.

* * * * *